United States Patent
Okataku et al.

(10) Patent No.: US 6,209,019 B1
(45) Date of Patent: Mar. 27, 2001

(54) DATA PROCESSING SYSTEM, COMPUTER NETWORK, AND DATA PROCESSING METHOD

(75) Inventors: Yasukuni Okataku, Chiba; Toshibumi Seki, Yokohama; Tetsuo Hasegawa; Hiroshi Kaibe, both of Tokyo; Shinsuke Tamura, Yokohama, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 08/611,421

(22) Filed: Mar. 6, 1996

(30) Foreign Application Priority Data

Mar. 13, 1995 (JP) .................................... 7-52215

(51) Int. Cl.$^7$ .................................................. G06F 13/24
(52) U.S. Cl. .................................. 709/107; 710/260
(58) Field of Search .................................. 395/733, 704, 395/680; 709/107, 108, 102, 100; 710/260, 4

(56) References Cited

U.S. PATENT DOCUMENTS

| | | | |
|---|---|---|---|
| 5,432,798 | * | 7/1995 | Blair ........................................ 371/32 |
| 5,450,586 | * | 9/1995 | Kuzara et al. ........................ 395/704 |
| 5,551,047 | * | 8/1996 | Mori et al. ............................. 712/28 |
| 5,581,770 | * | 12/1996 | Suzuki .................................. 395/733 |
| 5,628,018 | * | 5/1997 | Matszuaki et al. .................... 395/733 |
| 5,630,135 | * | 5/1997 | Orimo et al. .......................... 395/706 |
| 5,634,130 | * | 5/1997 | Lee ........................................ 395/733 |
| 5,715,386 | * | 2/1998 | Fulton, III et al. ..................... 714/47 |
| 5,748,882 | * | 5/1998 | Huang ..................................... 714/47 |

OTHER PUBLICATIONS

Laprie et al., "Definition and Analysis of Hardware—and Software—Fault—Tolerant Architectures", IEEE Computer, 23 (7) :39–51 (1990). [Reprinted as pp. 5–17].

* cited by examiner

Primary Examiner—Majid Banankhah
Assistant Examiner—Sue Lao
(74) Attorney, Agent, or Firm—Finnegan, Henderson, Farabow, Garrett & Dunner, L.L.P.

(57) ABSTRACT

It is an object of this invention to provide a data processing system, computer network, and data processing method which enable alternate programs to run without degrading the system processing performance.

When control of a program executed by the executing means 1 reaches a pre-defined execution checkpoint, the notifying means 3 issues an interrupt instruction and the sending/receiving means 4 sends this instruction to other nodes. In a node where this interrupt instruction is received, the interrupt controlling means 5 causes the executing means 1 to interrupt processing if program control has not yet reached a pre-defined execution checkpoint in the node.

6 Claims, 10 Drawing Sheets

DATA PROCESSING SYSTEM, COMPUTER NETWORK, AND DATA PROCESSING METHOD

BACKGROUND OF THE INVENTION

1. Field of the Invention

This invention relates to a data processing system, network, and data processing method which increase reliability by executing processes using programs in a plurality of versions.

2. Description of the Prior Art

In systems, such as industrial systems, traffic control systems, and power plant systems such as a nuclear power plant, where ever-changing data is processed and the system is controlled based on the processing result, the safety of the system must be maintained under any condition.

This means that reliability is vital to data processing system devices such as computers or computer networks which are used in those systems. In particular, system errors have significant effects on those devices. System errors are caused by hardware errors or program bugs. Recently, as hardware reliability increases, program reliability has become more important. However, as programs become large and complicated, it is virtually impossible to create error-free programs.

To solve this problem, software techniques which make a program appear free of errors have been proposed even when the program has errors.

One of those techniques widely accepted is what we call a multiversionning method. This method puts a computer in the multiversionning mode to allow the programs in the computer to be run in the multiversionning mode. It enables the system to continue normal operation even if a system error occurs. However, running a program in the multiversionning mode requires that a plurality of program copies must be created. So, if the program has one or more bugs, multi-versioned programs stop due to the same bug, causing the computer or a part of system functions to stop. To solve this problem, the methods given below have been proposed:

(1) N versions program method

In this method, a plurality of designers create programs which perform the same function using different procedures. Thus, a plurality of programs, each with its own version, are created to perform the same function. This "N versions program method" allows a plurality of programs to be run in the computer concurrently. These programs, driven by the program called a driver which behaves just like an operating system (OS), are synchronized by the driver each time they reach pre-defined checkpoints. When the majority of programs produce the same result, that result is selected as a correct output.

(2) Recovery block method

This method is described below using program B and its alternate programs B' and B".

In this recovery block method, checkpoints, at which a predetermined amount of processing ends, are provided for program B and alternate programs B' and B", and the test (acceptance test) is made to check if the execution result of processing matches the desired value. First, program B is run, and the acceptance test is executed at a checkpoint to check if the execution result is acceptable. If the execution result of program B is acceptable, processing continues; otherwise, alternate program B' is started.

When the execution result is rejected, alternate program B' is started to perform alternate processing. At this time, the internal status at the preceding successful checkpoint, that is, the checkpoint data accepted by the acceptance test at the preceding checkpoint, is passed to alternate program B' for use in alternate processing. The result of this alternate processing is then checked by the acceptance test and, if it is rejected, alternate program B" is started. This processing is repeated until the execution result is accepted by the acceptance test or until there is no more alternate programs. Therefore, if the execution result of alternate program B" is also rejected, program B is determined to be unreliable.

(3) Self-checking method

Alternate programs B' and B" are started after program B fails in the acceptance test in the recovery block method described above, while alternate programs B' and B" are run concurrently with program B in the self-checking method. Note that, in the self-checking method, alternate program B' takes over the processing of program B and outputs data to external programs only after the acceptance test of program B fails, 3. Problems to Be Solved by the Invention The methods described above have the following problems. In the "N versions program method", when a plurality of programs in different versions are run concurrently, the system must wait, at each checkpoint, for the slowest program to end. Therefore, during daily operation, the overall system performance is determined by the processing performance of the slowest program.

In the "recovery block method" or "self-checking method", an alternate program takes over processing only after the program fails in the acceptance test. This take-over processing requires time and delays program processing. In addition, since an alternate program usually places emphasis on less bugs rather than on performance, program B' is slower than program B during concurrent operation. This loses the advantage of concurrent operation. An attempt to run alternate programs B' and B" concurrently with, and as fast as, program B will result in the disadvantage associated with the "N versions method".

Conventional program high-reliability methods are intended for increasing the software reliability rather than for detecting and recovering from hardware failures. There is a method in which the same program is run in other computers concurrently so that the program keeps running even when an error occurs in one of computers. However, if it is difficult to determine whether the error is a software error or a hardware error, the conventional software high-reliability method does not solve the problem; that is, when a hardware error occurs in a system where this method is employed, control is passed to a poorer-performance alternate program and, as a result, the performance is degraded.

Even if it is possible to determine whether a system error is a hardware error or a software error, the program for that determination must always be active. In addition, there is a possibility that a hardware error and a software error occur at the same time. This makes the determination and the subsequent take-over processing more difficult.

SUMMARY OF THE INVENTION

This invention is intended to solve the problems associated with the conventional techniques. It is an object of this invention to provide a data processing system, computer network, and data processing method which can pass processing to an alternate program without being affected by the poorest performance version and without wasting time in passing processing to an alternate program. It is also an object of this invention to provide a data processing system, computer network, and data processing method which are capable of keeping a program running not only when a software error occurs, but also when a hardware occurs.

In accordance with one aspect of the present invention, a data processing system allows a plurality of programs, each designed according to its own version to run concurrently, the data processing system executing processes each corresponding to one of the plurality of programs, the data processing system comprising executing means, provided for each of the plurality of programs, for executing a first process corresponding to a first of the programs; detecting means for detecting an execution point of the first process executed by the executing means; notifying means for issuing an interrupt instruction to programs other than the first program when an execution point of the first process detected by the detecting means has reached a pre-defined execution checkpoint; sending/receiving means for sending the interrupt instruction issued by the notifying means to all programs other than the first program and for receiving an interrupt instruction from one of the other programs; and interrupt controlling means for controlling the executing means to interrupt the processing of the first process if the execution point of the first process detected by the detecting means has not yet reached the pre-defined execution checkpoint when the sending/receiving means receives the interrupt instruction from one of the other programs; wherein the notifying means issues the interrupt instruction for the other programs if the sending/receiving means has not yet received the interrupt instruction from any other program when the execution point of the first process reaches the pre-defined execution checkpoint, and wherein the executing means discontinues the processing of the first program when the processing of the first program has been interrupted by the interrupt controlling means, while otherwise continuing the processing of the first program.

In accordance with another aspect of the present invention, a data processing system which allows a plurality of programs, each designed according to its own version to run concurrently, the data processing system executing processes, each corresponding to one of the plurality of programs, the data processing system comprising executing means, provided for each of the plurality of programs, for executing a first process corresponding to a first of the programs; detecting means for detecting an execution point of the first process executed by the executing means; notifying means for issuing an interrupt instruction to programs other than the first program when an execution point of the first process detected by the detecting means has reached a pre-defined execution checkpoint; sending/receiving means for sending the interrupt instruction issued by the notifying means to some of the programs other than the first program, the execution points of which have not yet reached the pre-defined execution checkpoint, and for receiving an interrupt instruction from one of the other programs; and interrupt controlling means for controlling the executing means to interrupt the processing of the first program when the number of interrupt instructions the sending/receiving means has received from the other programs reaches a specified number; wherein the executing means discontinues the processing of the first program when the processing has been interrupted by the interrupt controlling means, while otherwise continuing the processing of the first program.

According to the invention, a processing interrupt instruction is sent to other programs when control reaches the pre-defined execution checkpoint. Upon receiving this interrupt instruction, each of other programs interrupts processing if control has not yet reached the pre-defined execution checkpoint. If it has, the program continues processing.

For example, assume that there are a plurality of programs, each providing its own performance, which run asynchronously and concurrently. Also assume that the pre-defined execution checkpoint is a point where a specific operation ends. Normally, the highest-performance program ends the operation first. When the highest-performance program sends the processing interrupt instruction to other programs, a program which receives the instruction ends processing if it has not yet ended the operation. On the other hand, if the program has ended the operation before the highest-performance program sends the interrupt instruction to it, the program does not interrupt processing but continues with the next processing.

Normally, in the operating environment where a plurality of programs run concurrently, the system performance depends on the poorest-performance program. However, according to a feature of the invention, the processing of a slow program is interrupted when the highest-performance program reaches the pre-defined execution checkpoint, meaning that the system performance does not depend on poor-performance programs.

In accordance with another aspect of the present invention, a data processing system which allows a plurality of programs, each designed according to its own version to run concurrently, the data processing system executes each corresponding to one of the plurality of programs, the data processing system comprising executing means, provided for each of the plurality of programs, for executing a first process corresponding to a first of the programs; detecting means for detecting an execution point of the first process executed by the executing means; notifying means for notifying the internal state data of the first program when an execution point of the first process of the first program detected by the detecting means has reached a pre-defined execution checkpoint; testing means for executing an acceptance test which checks the propriety of the first program based on the internal state data of the first program when the execution point of the first process of the first program detected by said detecting means has reached the pre-defined execution checkpoint and which executes an acceptance test which checks the propriety of the programs other than the first program based on internal state data sent from some of the programs when the execution point has not yet reached the pre-defined execution checkpoint; sending/receiving means for sending the internal state data of the first program to some programs other than the first program, the execution points of which have not yet reached the pre-defined execution checkpoint, when the testing means executes an acceptance test on the first program and, at the same time, when the result of the acceptance test is acceptable, sending back a result to the corresponding sending program when the testing means executes the acceptance test on one of the programs other than the first program and, for receiving internal state data when it is sent from one of the programs other than said first program and for receiving a result when the result of an acceptance test is sent back from one of the other programs; judging means for making a general judgment on the first program based on the results of acceptance tests executed in the programs other than the first program when the number of results of the acceptance tests received by the sending/receiving means from the other programs reaches a specified number; and interrupt controlling means for interrupting the processing of the executing means when the testing means executes the number of the interrupt instructions the sending/receiving means has received from the other programs reaches a specified number; wherein the executing means does not continue the processing of the corresponding program any more if the processing is interrupted by the interrupt controlling means, while it continues the processing of the corresponding program in any other cases.

In accordance with another aspect of the present invention, a data processing method which allows a plurality of programs, each designed according to its own version to run concurrently, the data processing system executing processes each corresponding one of the plurality of programs, the data processing system comprising executing means, provided for each of the plurality of programs, for executing a first process corresponding to a first of the programs; detecting means for detecting an execution point of the first process executed by the executing means; notifying means for notifying the internal state data of the first program when an execution point of the first process of the first program detected by the detecting means has reached a pre-defined execution checkpoint; testing means for executing an acceptance test which checks the propriety of the first program based on the internal state data of the first program when the execution point of the first process of the first program detected by the detecting means has reached the pre-defined execution checkpoint and which executes an acceptance test which checks the propriety of the programs other than the first program based on internal state data sent from some of the other programs when the execution point has not yet reached the pre-defined execution checkpoint; sending/receiving means for sending internal state data of the first program to some programs other than the first program, the execution points of which have not reached the pre-defined execution checkpoint, when the execution point of the first process of the first program detected by said detecting means reaches the pre-defined execution checkpoint and for sending back a result to the corresponding sending program when the testing means executes the acceptance test on one of the programs other than the first program, and, for receiving internal state data when the internal state data is sent from one of the other programs and for receiving a result when the result of an acceptance test on the first program is sent back from one of the other programs; judging means for making a general judgment on the first program based on the results of acceptance tests executed in programs other than the first program and on the result of an acceptance test on the first program made by the test means when the number of results of the acceptance tests received by the sending/receiving means for the other programs reaches a specified number; and interrupt controlling means for interrupting the processing of the executing means either when the result of the general judgment made by the judging means is rejected or when the number of acceptable results of acceptance tests on the programs other than the first program made by the testing means based on the internal state data of the other programs reaches the specified number; wherein the executing means does not continue the processing of the first program when the processing is interrupted by the interrupt controlling means, while it otherwise continues the processing of the first program.

According to the invention, each program issues the processing interrupt instruction to all the other programs when control reaches the pre-defined execution checkpoint. When the number of interrupt instructions received from other programs reaches a specific number, the program interrupts its own processing; until then, the program continues processing.

Assume that a plurality of programs, each providing its own performance, run asynchronously and concurrently and that the point where a specific operation ends is defined as the execution checkpoint. Each program issues the processing interrupt instruction to all the other programs when that operation ends. When the highest-performance program ends the above-described operation, the number of interrupt instructions received in each of the other programs is 1. When the next-highest-performance program ends the above-described operation, the number of interrupt instructions received in each of the remaining other programs is 2. A program in which it is defined that processing should be interrupted when the number of interrupt instructions becomes 2 interrupts processing at this moment. And, a program in which it is defined that processing should be interrupted when the number of interrupt instructions becomes 3 interrupts processing when the third-highest-performance program ends. Similarly, each program interrupts its processing according to the number of interrupt instructions defined in each program.

As described above, because slow programs interrupt processing as higher-performance programs end processing, the system can continue processing without the CPU time being wasted in slow programs. On the other hand, a program interrupts its processing after some programs have ended processing, assuring system safety.

In accordance with another aspect of the present invention, a computer network which has a plurality of data processing systems connected by communication lines and each concurrently running a program designed according to its own version, and which executes a process based on at least one of the programs wherein the data processing system comprises executing means for executing a first process of a first program; detecting means for detecting an execution point of the first process of the first program executed by the executing means; notifying means for issuing a process execution interrupt instruction to the data processing systems other than the data processing system executing the first program when an execution point of the process of the first program detected by the detecting means has reached a pre-defined execution checkpoint; sending/receiving means for sending an interrupt instruction issued by the notifying means to all of the other data processing systems and for receiving an interrupt instruction from one of the other data processing systems; and interrupt controlling means for controlling the executing means to interrupt the processing of the first program if the execution point detected by the detecting means has not yet reached the pre-defined execution checkpoint when said sending/receiving means receives the interrupt instruction from one of the other data processing systems; wherein the notifying means issues the interrupt instruction for the other data processing systems when the sending/receiving means has not received the interrupt instruction from any other of the processing systems when the execution point of the process of the first program reaches the pre-defined execution checkpoint; and executing means discontinues the processing of the first program when the processing has been interrupted by said interrupt controlling means, and otherwise continues the processing of the first program.

In accordance with another aspect of the present invention, a computer network which has a plurality of data processing systems connected by communication lines and each concurrently running a program designed according to its own version, and which executes a process based on at least one of the programs wherein said data processing system comprises executing means for executing a first process of a first program; detecting means for detecting an execution point of said first process of said first program executed by said executing means; notifying means for issuing a process execution interrupt instruction to the data processing systems other than the data processing system executing the first program when an execution point of the process of the first program detected by the detecting means has reached a pre-defined execution checkpoint; sending/receiving means for sending the interrupt instruction issued by the notifying means to some other data processing systems in which the execution points of the process of the programs executed by their executing means have not yet reached the pre-defined execution point and for receiving an interrupt instruction from one of the other data processing system; and interrupt controlling means for controlling the executing means to interrupt the processing of the first program when the number of interrupt instructions received from the other data processing systems reaches a specified number; wherein said executing means discontinues the processing of the first program when the processing has been interrupted by said interrupt controlling means, and otherwise continuing processing of the first program.

According to the invention, program reliability is assured as follows. Assume that a plurality of programs, each providing its own performance, run asynchronously and concurrently. When a program reaches the pre-defined execution checkpoint, it executes the acceptance test of its own based on the internal state data existing at that time. If the result is rejected, the program interrupts processing: if the result is acceptable, the program sends the above internal state data to other programs.

When a program whose control has not yet reached the pre-defined execution checkpoint receives this internal state data, it executes the acceptance test based on the received internal state data and sends back the result (accept/reject) of the acceptance test to the sending program. Because the sending program sends internal state data to all the other programs, it receives a plurality of results of the acceptance test. When the number of acceptance test results that were received from other programs has reached a specified number, the sending program makes a general judgment. This judgment criterion, defined for each node, may be an acceptance count threshold, rejection count threshold, acceptance-rejection ratio, and so forth. If the result of the general judgment is rejected, the program interrupts its processing.

On the other hand, a program, which executes the acceptance test based on received internal state data, counts the number of acceptance tests whose results are acceptable. When the count reaches a specified number, that is, when the number of other programs whose internal data was accepted by the program itself (accepted as correct data) reaches a specified number, the program interrupts its processing. In other words, when the number of other programs which have reached the pre-defined execution checkpoint and which perform processing correctly reaches a specified number, the program, which is slower than those programs, interrupts its processing.

Thus, each program evaluates itself not only by the acceptance test of itself but also by the acceptance test of other programs, ensuring increased program reliability.

In accordance with another aspect of the present invention, a computer network which has a plurality of data processing systems connected by communication lines and each concurrently running a program designed according to its own version, and which executes a process based on at least one of the programs, wherein the data processing system comprises executing means for executing a first process of a first program; detecting means for detecting an execution point of the first process of the first program executed by the executing means; notifying means for issuing a process execution interrupt instruction to the data processing systems other than the data processing system executing the first program when an execution point of the process of the first program detected by the detecting means has reached a pre-defined execution checkpoint; testing means for executing an acceptance test on the data processing system based on internal state data of the data processing system notified by the notifying means when the execution point of the first process of the first program detected by the detecting means has reached the pre-defined execution checkpoint or for executing an acceptance test on the other data processing system based on internal state data of the other data processing systems when the execution point has not yet reached the pre-defined execution checkpoint; sending/receiving means for sending internal state data of the data processing system to the other data processing systems when the execution points of the first process of the corresponding other programs have not yet reached the pre-defined execution checkpoint when said testing means executes an acceptance test on the data processing system and, at the same time when the result of the test is acceptable, sending back the result to the corresponding sending data processing when the testing means executes the acceptance test on one of said other processing systems, and, for receiving internal state data when the internal state data is sent from one of the other data processing system and for receiving the result of an acceptance test on the data processing system is sent back from one of the other data processing systems on its own program is sent back from one of said other programs; judging means for making a general judgment on the data processing system based on the results of acceptance tests on the data processing system executed in the other data processing systems when the number of results of the acceptance tests received by said sending/receiving means from said other data processing systems reaches a specified number; and interrupt controlling means for interrupting the processing of the executing means when said testing means executes the acceptance test on the data processing system and, at the same time, when the result of the test is rejected, or when the number of acceptable results of acceptance tests on the other data processing systems made by the testing means reaches a specified number; wherein the executing means discontinues the processing of the first program when the processing has been is interrupted by the interrupt controlling means, while it otherwise continues the processing of the first program.

In accordance with another aspect of the present invention, a computer network which has a plurality of data processing systems connected by communication lines and each concurrently running a program designed according to its own version, and which executes a process based on at least one of the programs, wherein the data processing system comprises executing means for executing a first process of a first program; detecting means for detecting an execution interrupt instruction to the data processing systems other than the data processing system executing the first program when an execution point of the process of the first program detected by said detecting means has reached a pre-defined execution checkpoint; first testing means for executing an acceptance test on the data processing system executing the first program based on the internal state data of the data processing system notified by the notifying means when the execution point of the first process of the first program detected by the detecting means has reached the pre-defined execution checkpoint or for executing an acceptance test on the data processing systems other than the data processing system executing the first program based on the internal state data of the other data processing systems when the execution point has not yet reached the pre-defined execution checkpoint; sending/receiving means for sending internal state data to some of the other data processing systems in which the execution points of the process of the programs executed by executing means of the other data processing systems have not yet reached the pre-defined execution checkpoint when the execution point detected by the detecting means reaches the pre-defined execution checkpoint and for sending back a result to the corresponding sending data processing system when the testing means executes the acceptance test on one of the other data processing systems, and, for receiving internal state data when the internal state data is sent from one of the other data processing systems and for receiving a result when the result of an acceptance test is sent back from one of said other data processing systems; judging means for making a general judgment based on the results of the acceptance tests executed in the other data processing systems and on the result of the acceptance test on the other systems received by said sending/receiving mean from said other data processing systems reaches a specified number; and interrupt controlling means for interrupting the processing of the executing means either when the result of the general judgment made by the judging means is rejected or when the number of acceptable results of acceptance tests on the other systems made by the testing means reaches a specified number; wherein the executing means discontinues the processing of the first program when the processing has been interrupted by the interrupt controlling means, while otherwise continuing the processing of the first program.

According to the invention, program reliability is assured as follows. Assume that a plurality of programs, each providing its own performance, run asynchronously and concurrently. When a program reaches the pre-defined execution checkpoint, it executes the acceptance test of its own based on the internal state data existing at that time and, at the same time, sends the internal state data to other programs.

When a program whose control has not yet reached the pre-defined execution checkpoint receives this internal state data, it executes the acceptance test based on the received internal state data and sends back the result (accept/reject) of the acceptance test to the sending program. When the number of acceptance test results that were received from other programs has reached a specified number, the sending program makes a general judgment based on the results of those acceptance tests and on the acceptance test of its own. If the result of the general judgment is rejected, the program interrupts its processing. On the other hand, a program which executes the acceptance test based on received internal state data interrupts its own processing when the number of other programs whose internal data was accepted by the program itself reaches a specified number.

Thus, each program evaluates itself not only by the acceptance test of itself but also by the acceptance test of other programs, ensuring increased program reliability.

Other and further objects, features and advantages of the invention will appear more fully from the following description.

DETAILED DESCRIPTION

The following explains this invention in further detail with reference to the accompanying drawings. The embodiments which will be described later are implemented on a computer, each function of an embodiment being executed by a procedure (program) controlling the computer. In each embodiment shown below, the data processing systems, which act as nodes connected by communication means, form a computer network such as a LAN.

A. First embodiment (A-1) Configuration of the first embodiment

First, the following explains a data processing system according to the first embodiment. This embodiment corresponds to claims 1, 9, and 17.

Figure 1:
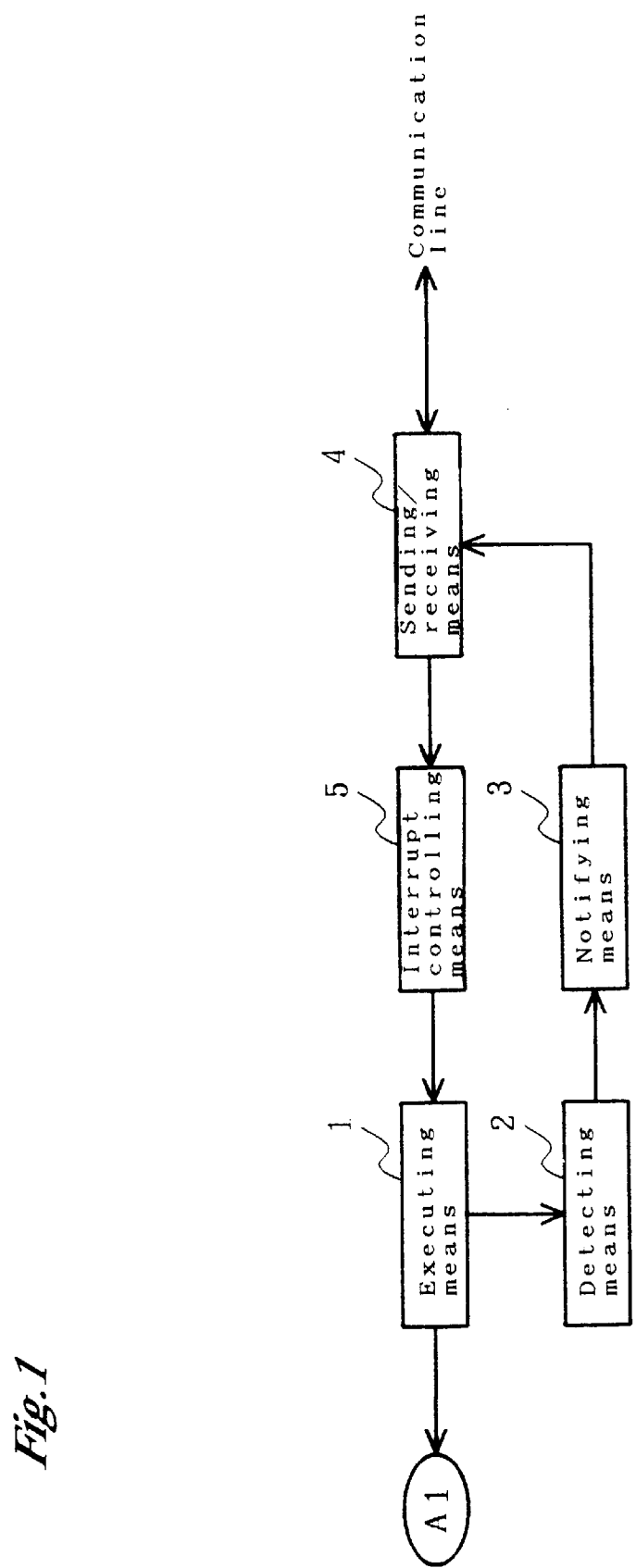
FIG. 1 is a block diagram showing an example of the configuration of a data processing system according to the first embodiment of this invention.

FIG. 1 is a block diagram showing the configuration of each node in the first embodiment of this invention. Nodes are connected by communication lines. FIG. 1 shows a node in which program A1 is executed. Though not shown in the diagram, other nodes are configured similarly. In those nodes, programs A2, A3, and so on, each with its own version number but executing the equivalent function, are executed. The format of input data to each node need not be the same; that is, input data to each node may be in a format determined according to the algorithm of each program. Nor need the format of output data be the same; that is, output data may be in a format acceptable by an external device or the program associated with each node may contain steps for determining the format of data.

As shown in FIG. 1, each node has the executing means 1 for executing a program, for example, program A1. In addition, each node has the detecting means 2 for detecting a point at which control of program A1, started by the executing means 1, has reached at a specific time, the notifying means 3 for issuing the interrupt instruction according to the detection result of the detecting means 2, the sending/receiving means 4 for sending data to, and receiving data from, other nodes via a communication line, and the interrupt controlling means 5 for interrupting the processing of the executing means 1.

For each of programs A1, A2, A3, and so on, an execution checkpoint is pre-defined. When a point detected by the detecting means 2 reaches the pre-defined execution checkpoint, the notifying means 3 issues the interrupt instruction. This interrupt instruction is sent by the sending/receiving means 4 of the node, via the communication line, to the sending/receiving means 4 of the other nodes. That is, the sending/receiving means 4 of a node, associated with one of programs A1. A2, A3, and so on where control has reached the pre-defined execution checkpoint first, sends the interrupt instruction to the sending/receiving means 4 of the other nodes.

On the other hand, in a node where the sending/receiving means 4 has received the interrupt instruction, the interrupt controlling means 5 checks whether or not the execution point detected by the detecting means 2 at that moment (that is, program control) has already reached the pre-defined execution checkpoint. If the execution point has not yet reached that checkpoint, the interrupt controlling means 5 interrupts the processing of the executing means 1.

(A-2) Operation of the first embodiment

Next, the following explains the operation of the data processing system in this embodiment. In this embodiment, it is assumed that program A1 has the fastest algorithm and that the processing performance decreases in the order: A1, A2, A3, and so on. It is also assumed that the probability of errors due to potential program bugs increases in the order: A1, A2, A3, and so on.

Figure 2:
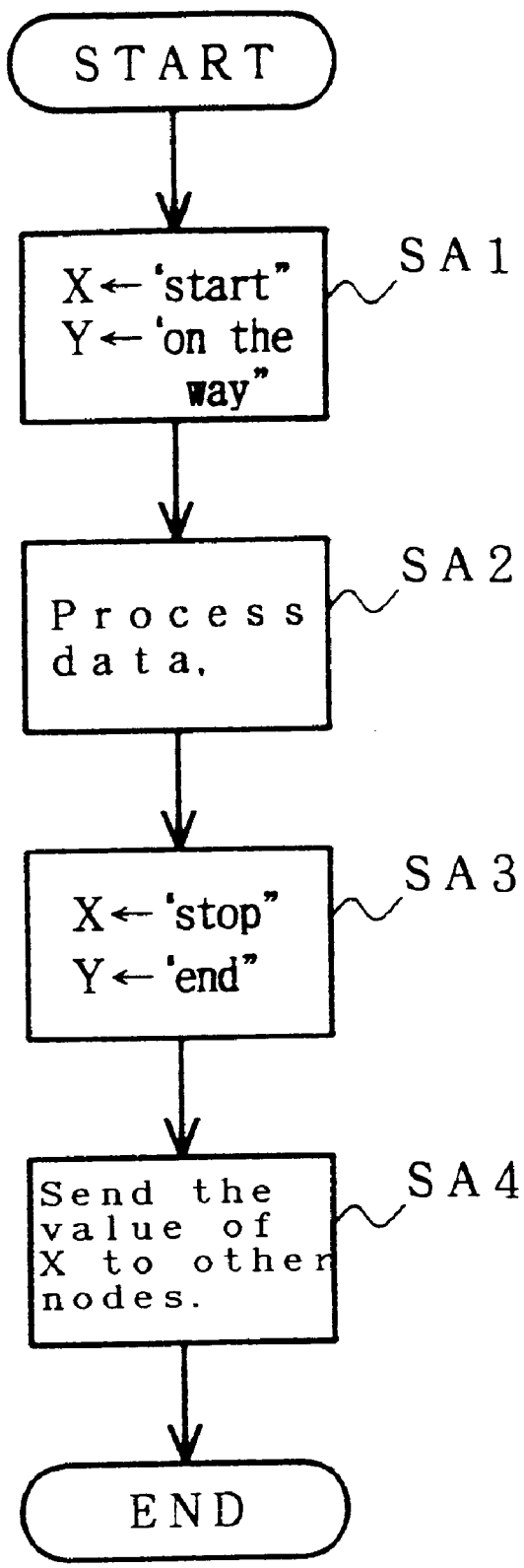
FIG. 2 is a flowchart showing the operation procedure of each node in a data processing system according to the first and third embodiments of this invention.

FIG. 2 shows a flowchart showing the operation sequence in each node. This processing flow is common to programs A1, A2, A3, and so on. Each program processes input data based on its own algorithm to create output data. When a sequence of data processing steps ends, each program sends the interrupt instruction to other programs.

First, the executing means 1 initializes the variables X and Y before starting program processing (step SA1). That is, it assigns "start" to the variable X, and "on the way" to the variable Y.

Then, each node processes data according to its program algorithm (step SA2). When the execution point detected by the detecting means 2 (that is, program control) has reached the pre-defined execution checkpoint (end of data processing in this case), the notifying means 3 assigns "stop", which is the interrupt instruction, to the variable X, and "end" to the variable Y to indicate that the node has ended its processing (step SA3). Then, the sending/receiving means 4 sends the contents of the variable X to other nodes via the communication line (step SA4).

In this embodiment, the highest-performance program A1 ends processing first in most cases. So, the node where program A1 is executed sends the contents of the variable X to nodes A2, A3, and so on where other programs are executed.

Figure 3:
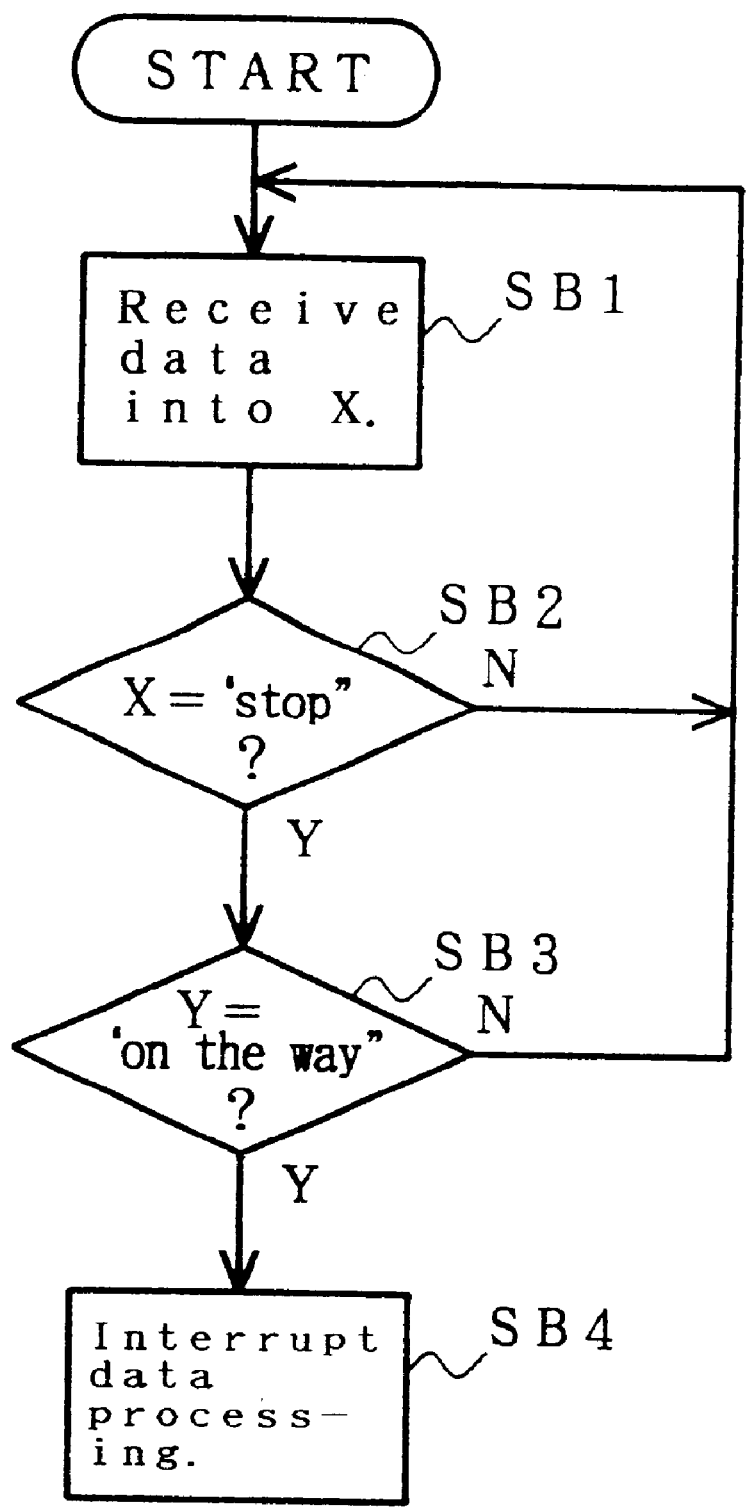
FIG. 3 is a flowchart showing the operation procedure of each node in a data processing system according to the first embodiment of this invention.

Now, referring to the flowchart in FIG. 3, there is shown the processing of a node which has received data into the variable X. First, when the sending/receiving means 4 receives data into X (step SB1), the interrupt controlling means 5 checks the contents of the variable X (step SB2). If the variable X contains "stop" which is the interrupt instruction, the interrupt controlling means 5 checks the contents of the variable Y (step SB3). If the variable Y contains "on the way" indicating that the node is processing data, the interrupt controlling means 5 causes the executing means 1 to interrupt data processing (step SB4).

After interrupting processing, the executing means 1 returns control to the pre-defined point, for example, the start of the program. However, when the executing means 1 of the node has already ended data processing and the notifying means 3 has already assigned "end" to the variable Y of the node, the executing means 1 keeps on processing. Normally, program A1 ends processing before other programs because it has the highest performance. In rare cases, some other program ends processing before program A1, as described below.

That is, some other program (for example, A2) ends processing before or almost at the same time program A1. This happens, for example, when the computer on which program A1 is executed runs slower than the computer on which program A2 is executed or when the processing load of program A1 is heavy. Even in those cases, program A2 ends data processing at the same time it receives the interrupt instruction from program A1 or when program A1 has ended data processing but not yet sends the interrupt instruction to other nodes.

Sometimes, while program A1 is processing data, program A1 fails due to a program bug or the computer on which program A1 is executed fails due to a hardware error. In this case, the executing means 1 stops processing and, therefore, an execution point detected by the detecting means 2 never reaches the pre-defined execution checkpoint. When this happens, the notifying means 3 does not change the contents of the variables X and Y, nor does the sending/receiving means 4 send the contents of the variable X to other nodes.

On the other hand, in the node where the next-highest-performance program A2 is executed, data processing ends. And, as described above, "stop" is assigned to the variable X, and "end" to the variable Y. Then, the contents of the variable X are sent from this node to the other nodes. Because the node where program A1 is executed is in the stopped state due to the error, the sending/receiving means 4 cannot receive data into the variable X. For other programs A3 and so on, data processing, if being executed by the executing means 1, is interrupted as described above.

Thus, when control of each program has reached the pre-determined execution checkpoint, the program sends the interrupt instruction to other programs. Upon receiving this interrupt instruction, each of these programs ends processing if control has not yet reached the pre-defined execution checkpoint; otherwise, it continues processing.

In the multiversionning environment where a plurality of programs run concurrently, the system performance usually depends on the slowest program. However, the highest-performance program interrupts the processing of slower programs in this embodiment as described above, thus preventing the low-performance program from affecting the overall system performance.

B. Second embodiment (B-1) Configuration of the second embodiment

The following explains a data processing system according to the second embodiment of this invention. This embodiment, corresponding to claims 2 and 10, is configured so that a node whose data processing is interrupted receives internal state data from a node who has ended data processing and, based on the received internal data, updates the internal state data of its own.

Figure 4:
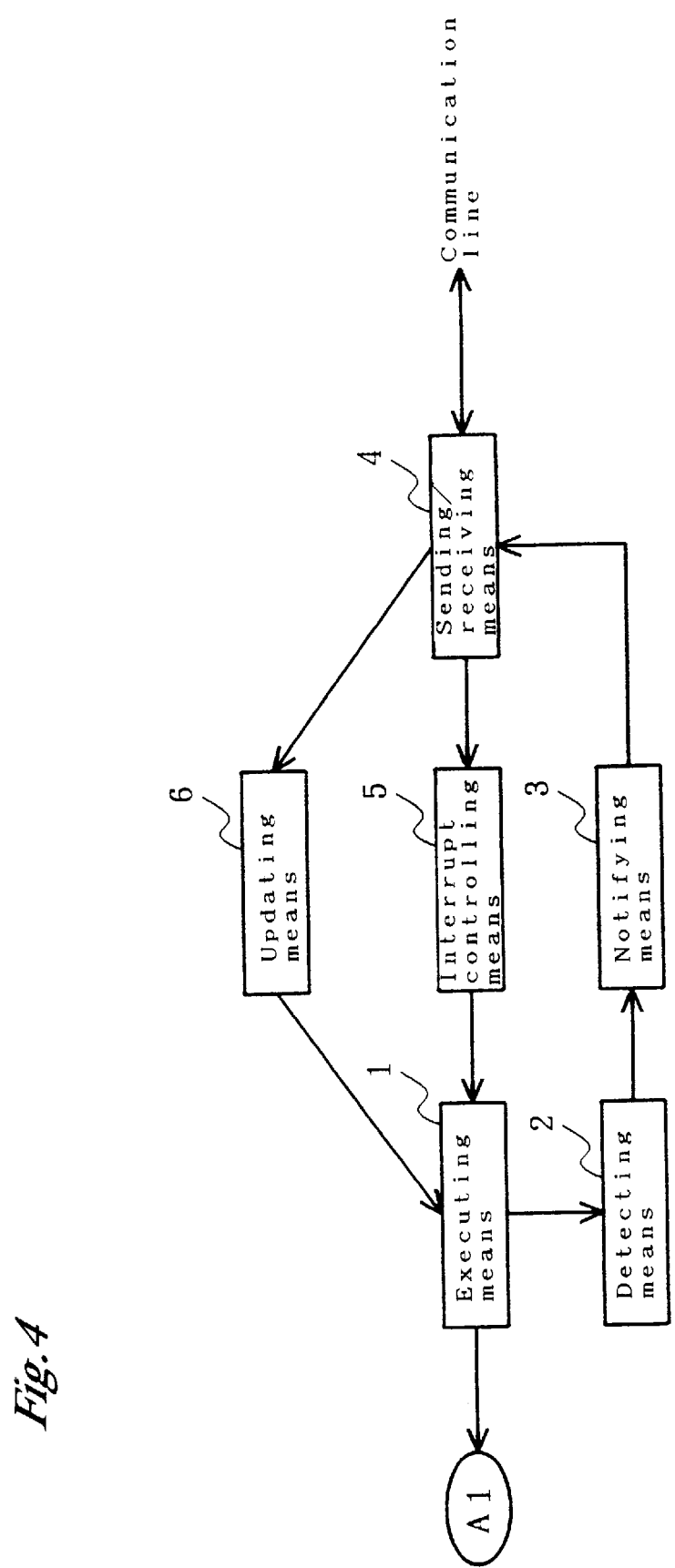
FIG. 4 is a block diagram showing an example of the configuration of a data processing system according to the second embodiment of this invention.

FIG. 4 is a block diagram showing the configuration of each node in the second embodiment. For those components and functions in this diagram that correspond to those in FIG. 1, the explanation is omitted here.

In this embodiment, when the execution point detected by the detecting means 2 has reached the pre-defined point, the notifying means 3 outputs the internal state data of the node at that time. The sending/receiving means 4 sends this internal state data to other nodes as the interrupt instruction. In addition, a node used in this embodiment has the updating means 6. This updating means 6 updates the internal state data of the node based on the internal state data of the sending node received by the sending/receiving means 4.

(B-2) Operation of the second embodiment

A data processing system in this embodiment operates as follows. In this embodiment, the values of data items X1, X2, and X3, which represent the execution result at that time, are sent as the internal state data of the node.

The main processing in this embodiment is almost similar to that in the first embodiment shown in FIG. 2 except the step in which a value is assigned to variable X. "stop" is assigned to variable X in the first embodiment, whereas the internal state values at that time, that is, values of data items X1, X2, and X3, are assigned to it in this embodiment (step SA3).

Figure 5:
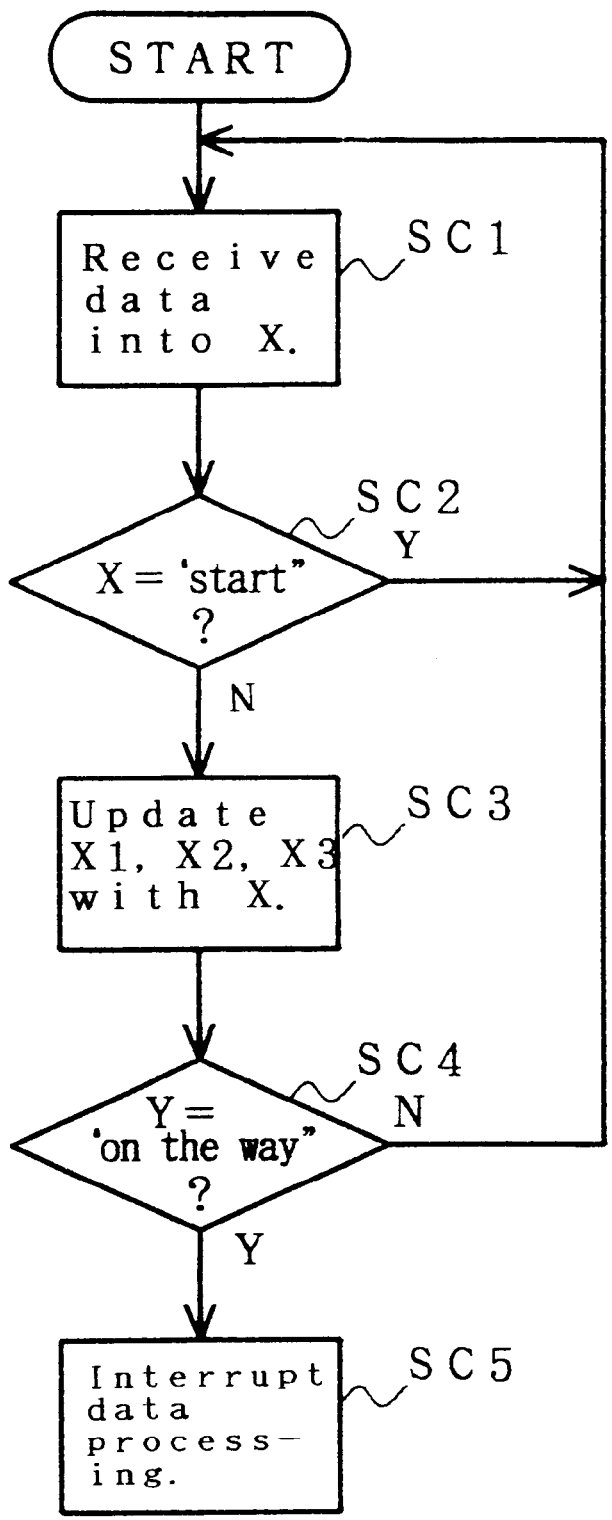
FIG. 5 is a flowchart showing the operation procedure of each node in a data processing system according to the second embodiment of this invention.

FIG. 5 shows how a node which receives data into the variable X operates. When the sending/receiving means 4 receives data into the variable X (step SC1), the interrupt controlling means 5 checks its contents (step SC2). If the variable X does not contain "start", the updating means 6 updates data items X1, X2, and X3 with the contents of the variable X (step SC3).

Then, the interrupt controlling means 5 checks the contents of the variable Y at that time (step SC4). If the variable Y contains "on the way", the interrupt controlling means 5 causes the executing means 1 to interrupt data processing (step SC5). After interrupting data processing, the executing means 1 returns control to the specified execution point.

If the variable X contains "start" meaning that the node which has sent data into the variable X did not perform processing correctly, or if the variable Y contains "end", the updating means 6 does not perform update processing and the executing means 1 continues processing.

If the program fails due to a program bug or the computer on which program is executed fails due to a hardware error while the program is processing data, the internal state data of the next-highest-performance program A2 is sent to other nodes as in the first embodiment.

As described above, when program control reaches the pre-defined execution checkpoint, the program sends the processing interrupt instruction to other programs. In this embodiment, the internal state data at that time is sent as the interrupt instruction. Upon receiving the interrupt instruction, the receiving programs interrupt data processing if their program control have not yet reached the pre-defined execution checkpoint, and update their internal state data with the received internal state data.

Thus, in an operating environment where a plurality of programs run concurrently, the internal state data of all the programs is updated synchronously based on the internal state data of the highest-performance program. This keeps the internal state data of low-performance programs updated with the internal state data of the highest-performance program, ensuring system reliability.

C. Third embodiment (C-1) Configuration of the third embodiment

The following explains a data processing system according to the third embodiment of this invention. This embodiment corresponds to claims 3, 11, and 18, with the configuration of a node equivalent to that shown in FIG. 1. However, in this embodiment, when the number of interrupt instructions the sending/receiving means has received from other nodes reaches the specified number, the interrupt controlling means 5 causes the executing means 1 to interrupt processing.

(C-2) Operation of the third embodiment

Figure 6:
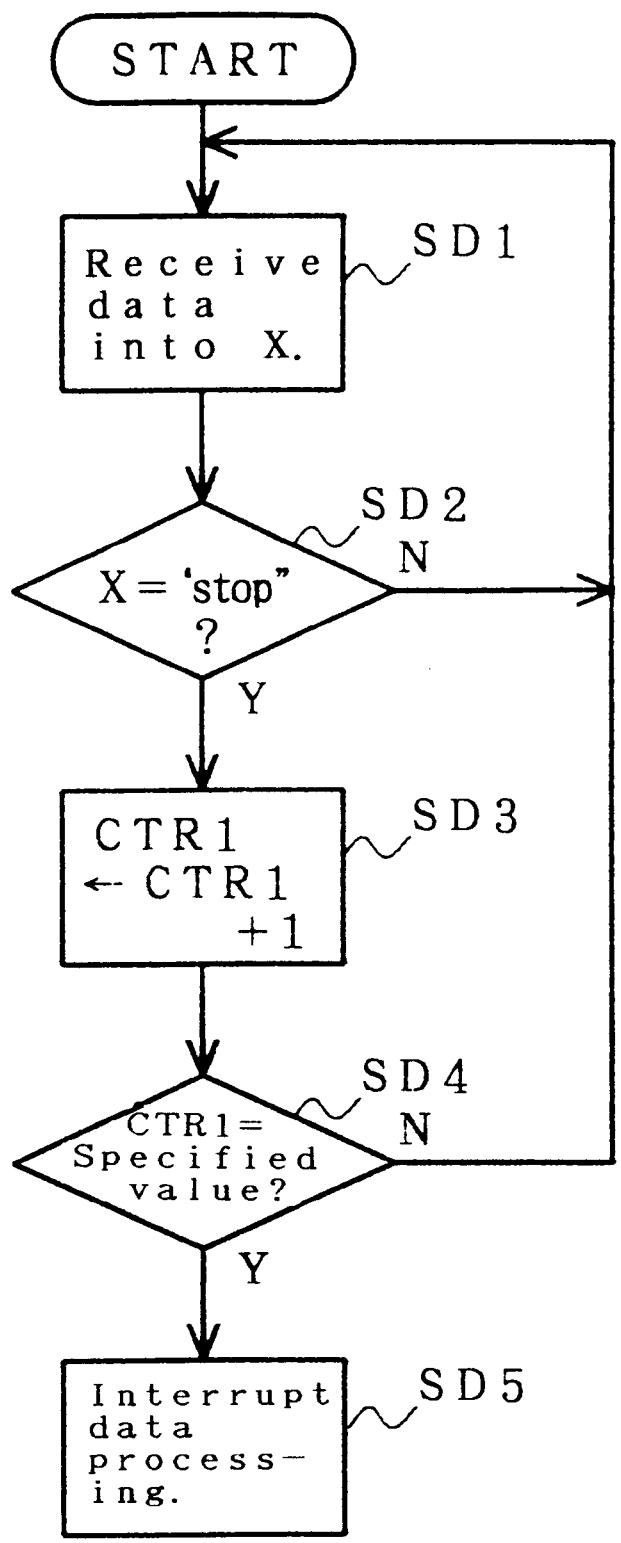
FIG. 6 is a flowchart showing the operation procedure of each node in a data processing system according to the third embodiment of this invention.

A data processing system according to this embodiment operates as follows. The main processing of this embodiment is the same as that of the first embodiment shown in FIG. 2. And, a node which receives data into the variable X performs the operation shown in FIG. 6.

First, when the sending/receiving means 4 receives data into the variable X (step SD1), the interrupt controlling means 5 checks its contents (step SD2). If the variable X contains "stop", the interrupt controlling means 5 increments counter CTR1 by 1 (step SD3). Note that counter CTR1 was initialized when the node was started. The interrupt controlling means 5 checks if counter CTR1 has reached the specified value (SD4) and, if it has, causes the executing means 1 to interrupt data processing (step SD5). Then, the executing means 1 interrupts processing and returns control to the specified position.

As described above, when control reaches the pre-defined execution checkpoint in each program, it sends the processing interrupt instruction to all the programs. And, each program continues processing until the number of interrupt instructions it has received from other programs reaches the specified value.

Thus, as several programs have ended processing, slow programs are interrupted. This means that the system can continue processing without being affected by slow programs. In addition, because a program is interrupted after the specified number of programs have ended processing, the system safety is assured.

D. Fourth embodiment (D-1) Configuration of the fourth embodiment

The following explains a data processing system according to the fourth embodiment of this invention. This embodiment corresponds to claims 4 and 12, and performs the acceptance test when program control has reached the pre-defined execution checkpoint.

Figure 7:
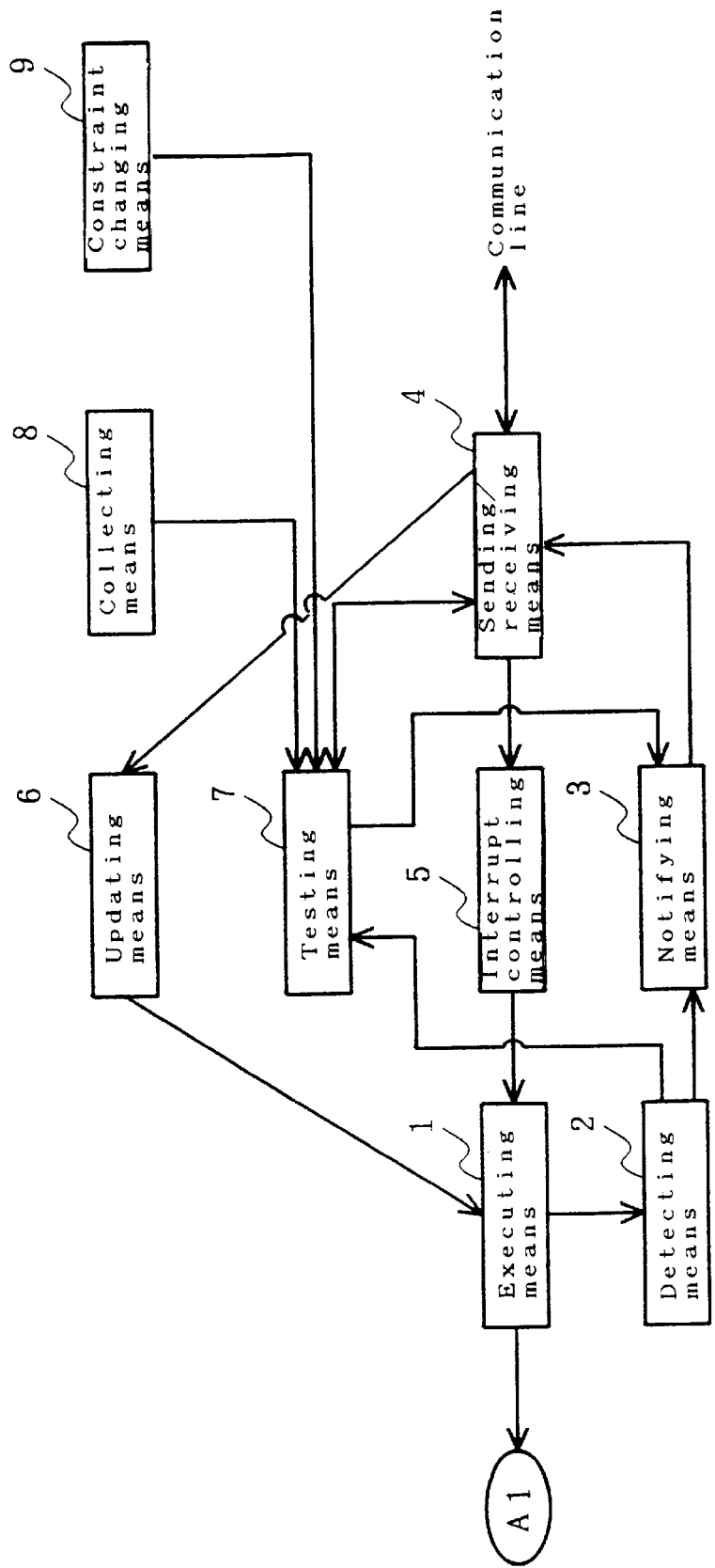
FIG. 7 is a block diagram showing an example of the configuration of a data process system according to the fourth embodiment of this invention.

FIG. 7 is a block diagram showing the configuration of each node in the fourth embodiment. For those components and functions equivalent to those in FIGS. 1 and 4, the explanation is omitted here.

A node in this embodiment has the testing means 7. When the execution point detected by the detecting means 2 reaches the pre-defined execution checkpoint, this testing means 7 performs the acceptance test based on the internal state of the node at that time. In this embodiment, the sending/receiving means 4 sends the interrupt instruction to other nodes only when the result of the acceptance test performed by the testing means 7 is acceptable.

In addition, the node shown in FIG. 7 has the collecting means 8 for collecting data necessary for the acceptance test and the constraint range changing means 9 for setting or changing the range of data (constraint range) collected by the collecting means 8.

(D-2) Operation of the fourth embodiment

Figure 8:
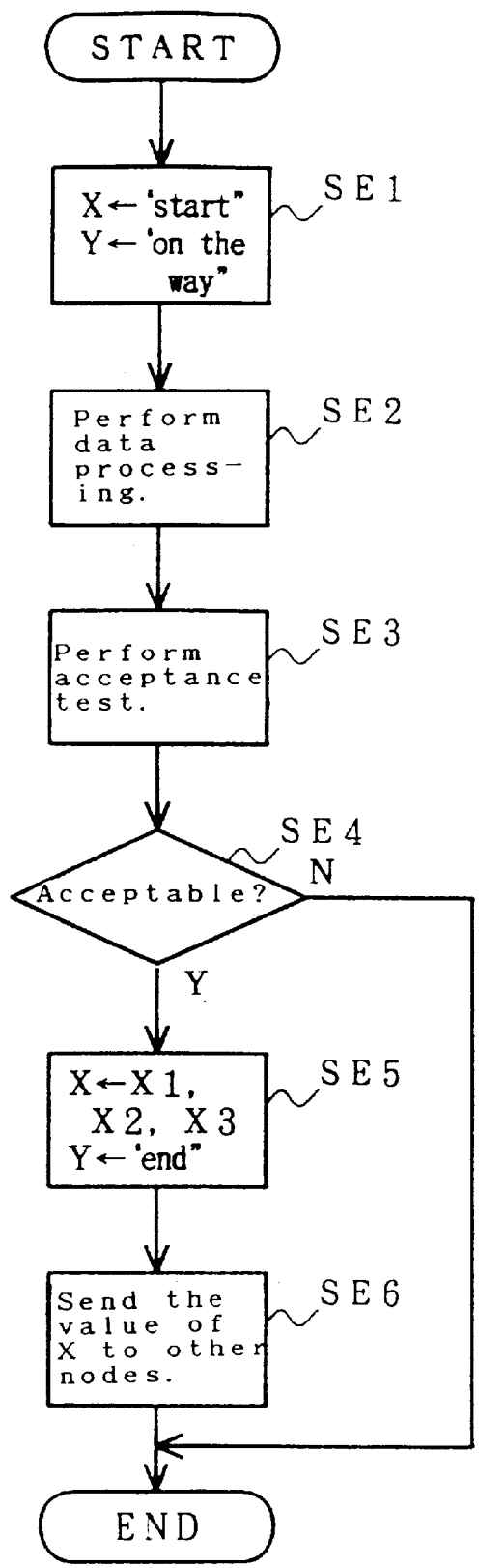
FIG. 8 is a flowchart showing the operation procedure of each node in a data processing system according to the fourth embodiment of this invention.

Referring to the flowchart in FIG. 8, there is shown the operation of a data processing system according to this embodiment.

In this embodiment, when the execution point detected by the detecting means 2 has reached the pre-defined execution checkpoint, the testing means 7 performs the acceptance test based on the internal state data at that time (step SE3). That is, it tests if the execution result values of data items X1, X2, and X3 are acceptable. If the result of this acceptance test is acceptable (step SE4), that is, if the values of data items X1, X2, and X3 are correct, the notifying means 3 assigns the values of X1, X2, and X3 to the variable X (step SE5). And, the sending/receiving means 4 sends the value of the variable X to other nodes (step SE6).

Here is the detailed description of the acceptance test. The collecting means 8 collects data to be used in the acceptance test performed by the testing means 7.

The following explains a system, such as a chemical plant, where complicated control is required. Assume that each node in the data processing system contains program A1 which directly controls the temperature of a reactor. In such a case, the temperature control performed in each node indirectly affects the pressure control or flow control of the neighboring piping. Therefore, the collecting means 8 collects not only the temperature data on the reactor but also the pressure data and flow data on the neighboring piping, and draws them as field data or stores them in the storing means (not drown).

Next, the testing means 7 selects data from the field data stored in the above storing means, and executes the acceptance test by referring to the values of selected field data. The testing means 7 checks the execution result of the executing means 1 to see if the result satisfies the selected field data, that is, the constraint relation defined for the temperature, pressure, and flow. That is, the testing means 7 checks the rate of change in the pressure and the rate of change in the flow at that moment fall within the constraint range with respect to the change in the temperature. If it is in the constraint range, the result of the acceptance test is acceptable.

The constraint range changing means 9 is provided to change the constraint relation defined for the temperature, pressure, and flow. In addition, this system has a monitor or some other unit to allow the operator to monitor changes and, with the constraint range changing means 9, to change the constraint relation. For example, in some cases, the operator judges that the rate of the change in the pressure and in the flow, though within the constraint range as a result of the acceptance test, is too large. In such a case, the constraint range changing means 9 allows the operator to select one or more temperature, pressure, and flow variables and to change their value ranges. This makes it possible for the operator to adjust the change in the field data for greater safety, further increasing the safety of the plant.

E. Fifth embodiment
(E-1) Configuration of the fifth embodiment

The following explains a data processing system according to the fifth embodiment of this invention. This embodiment, which corresponds to claims 5, 12, and 19, makes a judgment based on the results of acceptance tests in a plurality of nodes, each having its own test criteria, to decide more correctly when to interrupt processing. The configuration of each node in this embodiment is the same as that shown in FIG. 7.

In this embodiment, the testing means 7 executes the acceptance test based on the internal state data of other nodes received by the sending/receiving means 4 until the execution point of the program reaches the pre-defined execution checkpoint. The result of this acceptance test is sent back to the sending node via the sending/receiving means 4.

The interrupt controlling means 5 of this embodiment also has a function as the judging means stated in claims 5 and 13. When the number of test results received by the sending/receiving means 4 reaches a specified number, the interrupt controlling means 5 makes a general judgment based on those results. This general judgment is made based on its own judgment criterion. This judgment criterion, defined for each node, may be an acceptance count threshold, rejection count threshold, acceptance-rejection ratio, and so forth. If the result of the general judgment is rejected, the interrupt controlling means 5 causes the executing means 1 to interrupt the execution of the program.

On the other hand, in a node which receives internal state data from other nodes, the testing means 7 executes the acceptance test based on its own test criterion each time it receives internal state data. And, when the number of acceptable test results reaches a specified number, the interrupt controlling means 5 causes the executing means 1 to interrupt program execution.

(E-2) Operation of the fifth embodiment

The following explains how a data processing system according to this embodiment operates. In this embodiment, the processing up to the moment program control has reached the pre-defined execution checkpoint and the node sends its internal state data to other nodes is the same as that shown in FIG. 8.

Or, when program control has reached the pre-defined execution checkpoint, the node may also be designed so that the testing means 7 executes the acceptance test and, at the same time, the sending/receiving means 4 sends the contents of the variable X to other nodes.

Figure 9:
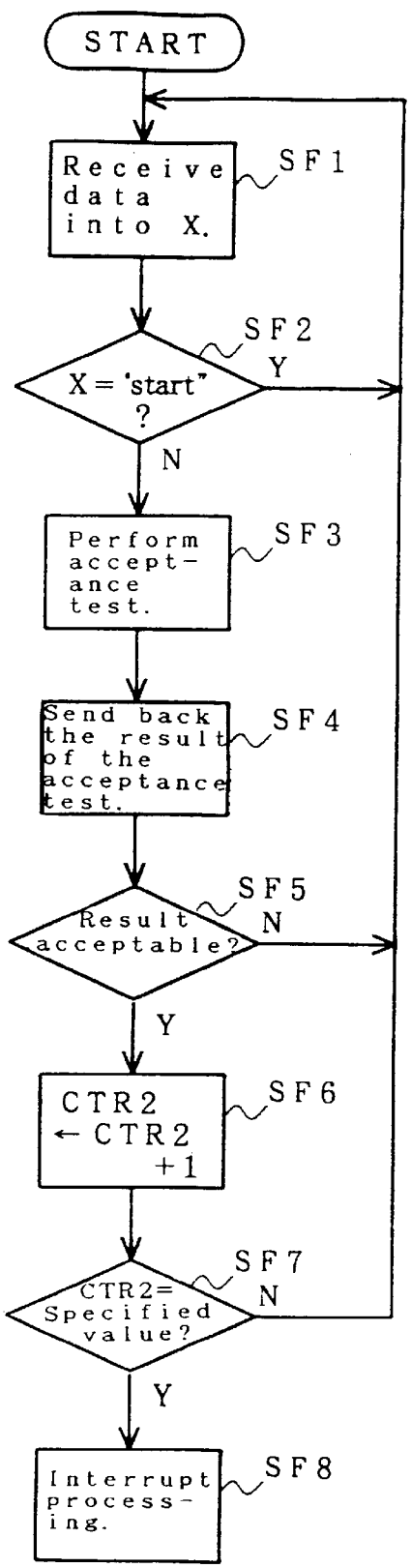
FIG. 9 is a flowchart showing the operation procedure of each node in a data processing system according to the fifth embodiment of this invention.

On the other hand, a node which receives data into the variable X performs the operation shown in FIG. 9. As shown in FIG. 9, if the contents of the variable X received by the sending/receiving means 4 are not "start", the testing means 7 executes the acceptance test (step SF3). This acceptance test is the same acceptance test described above which is executed when the node finishes its own data processing.

When this acceptance test ends, the sending/receiving means 4 sends back the result of this acceptance test to the sending node (step SF4). In addition, the check is made to see if the result of this acceptance test is acceptable (step SF5); if it is, counter CTR2 is incremented by 1 (step SF6). Note that counter CTR2 was initialized when the node was started. Then, the check is made to see if the value of counter CTR2 has reached a specified value (step SF7); if it has, the interrupt controlling means 5 causes the executing means 1 to stop processing (step SF8).

If the variable X to which data was sent from some other node contains "start", if the result of the acceptance test is rejected, or if the value of CTR2 has not yet reached a specified number, the node continues processing.

Figure 10:
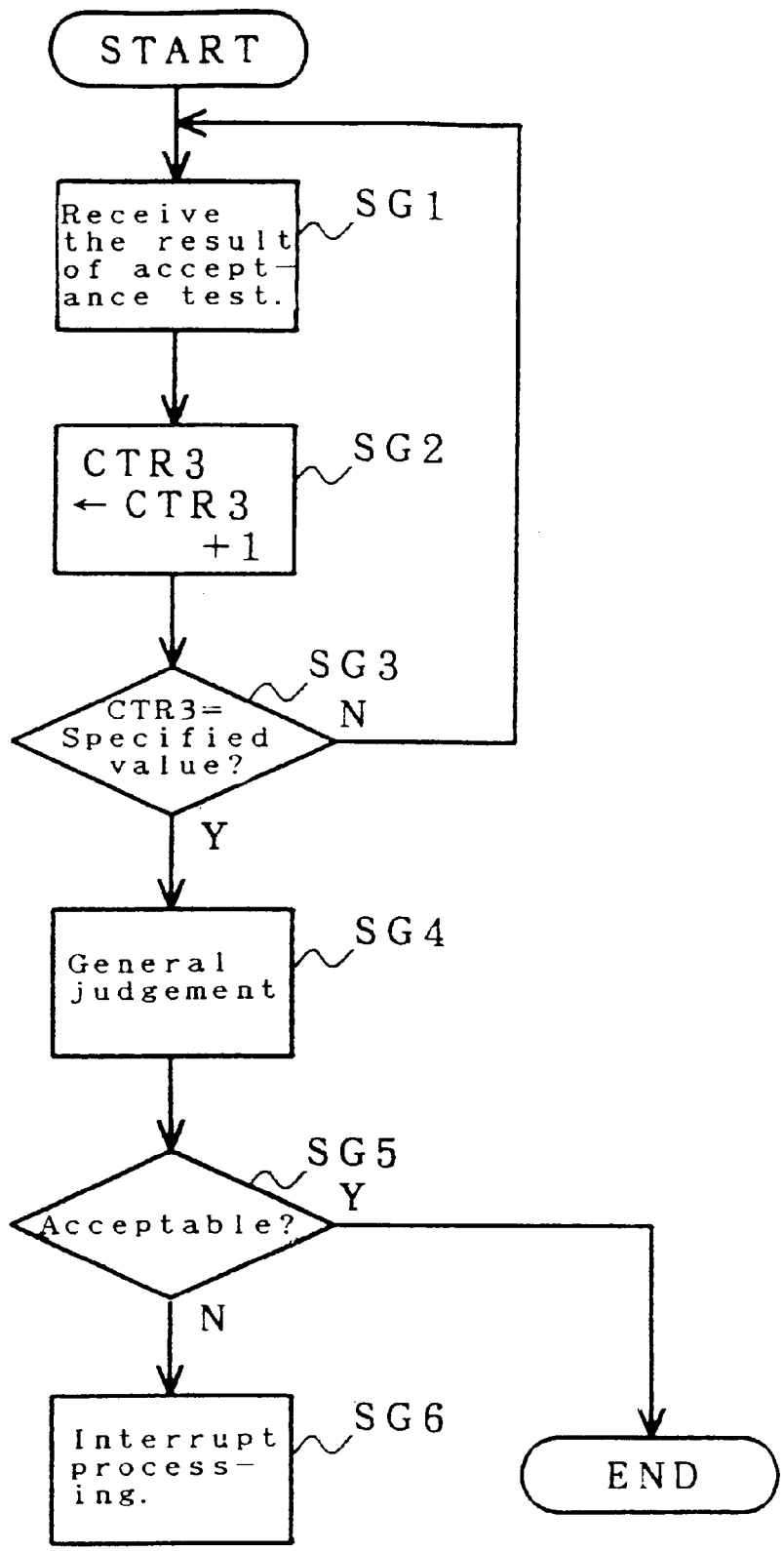
FIG. 10 is a flowchart showing the operation procedure of each node in a data processing system according to the fifth embodiment of this invention.

On the other hand, the node which receives the result of the acceptance test from each node performs the processing shown in FIG. 10. When the node accepts the result of the acceptance test (step SG1), it increments counter CTR3 by 1 (step SG2). Note that counter CTR3 was initialized when the node was started. And, the check is made to see if the value of counter CTR3 has reached a specified value (step SG3); if it has, the interrupt controlling means 5 makes a general judgment (step SG4). If the result of the general judgment is acceptable, the node continues processing; otherwise, the interrupt controlling means 5 causes the executing means 1 to stop processing (step SG6).

As described above, when program control reaches the pre-defined execution checkpoint, the program first executes its own acceptance test based on the internal state data at that time. If the result is rejected, the program interrupts processing; if the result is acceptable, the program sends the internal state data to other programs. When a program whose control has not yet reached the pre-defined execution checkpoint receives this internal state data, it executes the acceptance test based on the received internal state data and sends back the result (accept/reject) of the acceptance test to the sending program. Because the sending program sends internal state data to all the other programs, it receives a plurality of results of the acceptance test. When the number of acceptance test results that were received from other programs has reached a specified number, the sending program makes a general judgment. If the result of the general judgment is rejected, the program interrupts its processing.

On the other hand, a program which executes the acceptance test based on received internal state data counts the number of acceptance tests whose results are acceptable. When the count reaches a specified number, that is, when the number of other programs whose internal data was accepted by the program itself (accepted as correct data) reaches a specified number, the program interrupts its processing. In other words, when the number of other programs which have reached the pre-defined execution checkpoint and which perform processing correctly reaches a specified number, the program, which is slower than those programs, interrupts its processing.

Thus, in this embodiment, a node integrally judges the compatibility and validity of the program based not only on the acceptance test of its own but also on the processing results of other nodes. Because the program is evaluated by its own acceptance test and by the acceptance tests of other programs, the program becomes more reliable.

F. Other embodiments

This invention is not restricted to the preferred embodiments described above, but may be embodied in other specific forms, such as those described below, without departing from the spirit or essential characteristics thereof.

Although the processing stop instruction is sent in the form of a message in the embodiments described above, it may be sent via an external storage unit to which a plurality of CPUs can access. That is, when a node ends processing, the sending/receiving means 4 writes the interrupt instruction on the storage unit, from which the sending/receiving means 4 of other nodes read that interrupt instruction. In this case, the interrupt instruction contains the identifications of the versions to be interrupted.

Although the above embodiment is a network system to which a plurality of nodes are connected, the system may be built in a stand-alone computer which runs programs in the multi-tasking mode.

Effect of the Invention

As described above, this invention allows processing to be taken over to an alternate program without being affected by the lowest system-processing performance version and without wasting time in continuing system operation. This invention also allows a program to keep on running not only when a software error occurs but also when a hardware occurs, enabling the system to continue operation without interruption.

While a preferred embodiment has been described, variations thereto will occur to those skilled in the art within the scope of the present inventive concepts which are delineated by the following claims.

What is claimed is:

1. A data processing system which allows a plurality of programs, each designed according to its own version to run concurrently, the data processing system executing processes each corresponding to one of the plurality of programs, said data processing system comprising:

executing means, provided for each of said plurality of programs, for executing a firs process corresponding to a first of the programs;

detecting means for detecting an execution point of said first process executed by said executing means;

notifying means for notifying the internal state data of the first program when an execution point of the first process of the first program detected by said detecting means has reached a pre-defined execution checkpoint;

testing means for executing an acceptance test which checks the propriety of the first program based on the internal state data of the first program when the execution point of the first process of the first program detected by said detecting means has reached the pre-defined execution checkpoint and which executes an acceptance test which checks the propriety of the programs other than the first program based on internal state data sent from some of the other programs when the execution point has not yet reached the pre-defined execution checkpoint;

sending/receiving means for sending said internal state data of the first program to some programs other than the first program, the execution points of which have not yet reached the pre-defined execution checkpoint, when said testing means executes an acceptance test on the first program and, at the same time, when the result of the acceptance test is acceptable, sending back a result to the corresponding sending program when said testing means executes the acceptance test on one of said programs other than the first program, and, for receiving internal state data when it is sent from one of said programs other than said first program and for receiving a result when the result of an acceptance test is sent back from one of said other programs;

judging means for making a general judgment on the first program based on the results of acceptance tests executed in the programs other than the first program when the number of results of said acceptance tests received by said sending/receiving means from said other programs reaches a specified number; and interrupt controlling means for interrupting the processing of said executing means when said testing means executes the acceptance test on the first program and the result of the test is rejected, when the result of the general judgment made by said judging means is rejected, or when the number of acceptable results of acceptance tests on said programs other than said first program made by said testing means reaches the specified number;

wherein said executing means does not continue the processing of the first program when the processing is interrupted by said interrupt controlling means, while it otherwise continues the processing of the first program.

2. A data processing system as claimed in claim 1, further comprising:

data collecting means for collecting data necessary for said acceptance test executed by said testing means; and constraint range changing means for changing the constraint range of data collected by said data collecting means, wherein said testing means executes said acceptance test based on said data constraint range.

3. A data processing system which allows a plurality of programs, each designed according to its own version to run concurrently, the data processing system executing processes each corresponding to one of the plurality of programs, said data processing system comprising:

executing means, provided for each of said plurality of programs, for executing a &a process corresponding to a first of the programs;

detecting means for detecting an execution point of said first process executed by said executing means;

notifying means for notifying the internal state data of the first program when an execution point of the first process of the first program detected by said detecting means has reached a pre-defined execution checkpoint;

testing means for executing an acceptance test which checks the propriety of the first program based on the internal state data of the first program when the execution point of the first process of the first program detected by said detecting means has reached the pre-defined execution checkpoint and which executes an acceptance test which checks the propriety of the programs other than the first program based on internal state data sent from some of the other programs when the execution point has not yet reached the pre-defined execution checkpoint;

sending/receiving means for sending internal state data of the first program to some programs other than the first program, the execution points of which have not reached the pre-defined execution checkpoint, when the execution point of the first process of the first program detected by said detecting means reaches the pre-defined execution checkpoint and for sending back a result to the corresponding sending program when said testing means executes the acceptance test on one of said programs other than the first program, and, for receiving internal state data when the internal state data is sent from one of said other programs and for receiving a result when the result of an acceptance test on the first program is sent back from one of said other programs;

judging means for making a general judgment on the first program based on the results of acceptance tests executed in programs other than the first program and on the result of an acceptance test on the first program made by said test means when the number of results of said acceptance tests received by said sending/receiving means for said other programs reaches a specified number; and interrupt controlling means for interrupting the processing of said executing means either when the result of the general judgment made by said judging means is rejected or when the number of acceptable results of acceptance tests on the programs other than said first program made by said testing means based on the internal state data of said other programs reaches the specified number;

wherein said executing means does not continue the processing of the first program when the processing is interrupted by said interrupt controlling means, while it otherwise continues the processing of the first program.

4. A data processing system as claimed in claim 3, further comprising:

data collecting means for collecting data necessary for said acceptance test executed by said testing means; and constraint range changing means for changing the constraint range of data collected by said data collecting means, wherein said testing means executes said acceptance test based on said data constraint range.

5. A data processing system as claimed in claim 1 or 3 further comprising:

storing means for storing said interrupt instruction, wherein said sending/receiving means writes said interrupt instruction into said storing means and reads said interrupt instruction from said storing means.

6. A computer network which has a plurality of data processing systems connected by communication lines and each concurrently running a program designed according to its own version, and which executes a process based on at least one of the programs, wherein said data processing system comprises:

executing means for executing a first process of a first program;

detecting means for detecting an execution point of said first process of said first program executed by said executing means;

notifying means for issuing a process execution interrupt instruction to the data processing systems other than the data processing system executing the first program when an execution point of the process of the first program detected by said detecting means has reached a pre-defined execution checkpoint;

testing means for executing an acceptance test on the data processing system executing the first program based on internal state data of the data processing system notified by said notifying means when the execution point of the first process of the first program detected by said detecting means has reached the pre-defined execution checkpoint or for executing an acceptance test on the data processing systems other then the data processing system executing the first program based on the internal state data of the other data processing systems when the execution point has not yet reached the pre-defined execution checkpoint;

sending/receiving means for sending internal state data to some of the other data processing systems in which the execution points of the process of the programs executed by executing means of the other data processing systems have not yet reached the pre-defined execution checkpoint when the execution point detected by said detecting means reaches the pre-defined execution checkpoint and for sending back a result to the corresponding sending data processing system when said testing means executes the acceptance test on one of said other data processing systems, and, for receiving internal state data when the internal state data is sent from one of said other data processing systems and for receiving a result when the result of an acceptance test is sent back from one of said other data processing systems;

judging means for making a general judgment based on the results of acceptance tests executed in the other data processing systems and on the result of the acceptance test on the system executed by said test means when the number of the results of the acceptance tests on the system executed in other systems received by said sending/receiving means from said other data processing systems reaches a specified number; and interrupt controlling means for interrupting the processing of said executing means either when the result of the general judgment made by said judging means is rejected or when the number of acceptable results of acceptance tests on said other systems made by said testing means reaches a specified number;

wherein said executing means discontinues the processing of the first program when the processing has been interrupted by said interrupt controlling means, while otherwise continuing the processing of the first program;

and wherein said data processing system further comprises data collecting means for collecting data necessary for said acceptance test executed by said testing means; and constraint range changing means for changing the constraint range of data collected by said data collecting means, wherein said testing means executes said acceptance test based on said data constraint range.

* * * * *